US011960269B2

(12) United States Patent
Jain et al.

(10) Patent No.: US 11,960,269 B2
(45) Date of Patent: Apr. 16, 2024

(54) VALIDATING OPERATOR SAFETY REQUIREMENTS

(71) Applicant: International Business Machines Corporation, Armonk, NY (US)

(72) Inventors: Prashant Jain, Singapore (SG); Sarbajit K. Rakshit, Kolkata (IN); Ai Kiar Ang, Singapore (SG); Rambabu Parvatina, Singapore (SG); Gary Kim Chwee Lim, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 17/324,141

(22) Filed: May 19, 2021

(65) Prior Publication Data

US 2022/0374001 A1 Nov. 24, 2022

(51) Int. Cl.
*G05B 19/418* (2006.01)
*G05B 23/02* (2006.01)
*H04W 4/70* (2018.01)

(52) U.S. Cl.
CPC ... *G05B 19/4187* (2013.01); *G05B 19/41815* (2013.01); *G05B 19/41855* (2013.01); *G05B 23/0205* (2013.01); *H04W 4/70* (2018.02); *G05B 2219/24015* (2013.01); *G05B 2219/24024* (2013.01); *G05B 2219/24162* (2013.01); *G05B 2219/24167* (2013.01)

(58) Field of Classification Search
CPC .......... G05B 19/4187; G05B 19/41815; G05B 19/41855; G05B 23/0205; G05B 2219/24015; G05B 2219/24024; G05B 2219/24162; G05B 2219/24167; G05B 19/0428; H04W 4/70; H04W 12/06
See application file for complete search history.

(56) References Cited

U.S. PATENT DOCUMENTS

| | | | |
|---|---|---|---|
| 6,711,465 B2 | 3/2004 | Tomassi | |
| 10,769,562 B2 | 9/2020 | Morgenthau | |
| 2008/0223926 A1 | 9/2008 | Miller | |
| 2017/0309152 A1 | 10/2017 | Dinkins | |
| 2018/0108236 A1* | 4/2018 | Kanukurthy | ....... G06Q 10/0639 |
| 2020/0167931 A1* | 5/2020 | Ge | ............................ G06T 7/12 |
| 2020/0326669 A1 | 10/2020 | Penna Santana | |

(Continued)

OTHER PUBLICATIONS

"Find a product" IBM, Downloaded Apr. 6, 2021, 6 pages, <https://www.ibm.com/sg-en/products>.

(Continued)

*Primary Examiner* — Tuyen K Vo
(74) *Attorney, Agent, or Firm* — Stephen R. Yoder

(57) ABSTRACT

An opt-in from at least one user of a plurality of users associated with at least one tool of a plurality of tools is received. An authentication associated with a first opted-in user of the plurality of users associated with an access of a first tool of the plurality of tools is determined. A set of credentials required to operate the first tool associated with the first opted-in user is verified. A request to an Internet of things (IoT) receiver device is transmitted. A response from an IoT transmitter device is received. In response to determining that the first user is utilizing required equipment to operate the first tool, power to the first tool is supplied.

20 Claims, 3 Drawing Sheets

(56) References Cited

U.S. PATENT DOCUMENTS

2020/0334970 A1  10/2020  Kanukurthy
2023/0084106 A1* 3/2023  Sobol .................... G08B 21/22
                                                340/5.61

OTHER PUBLICATIONS

"IBM Helps Organizations Monitor Their Workers' Safety with Watson IoT", Feb. 13, 2019, 4 pages, <https://newsroom.ibm.com/2019-02-13-IBM-Helps-Organizations-Monitor-Their-Workers-Safety-with-Watson-IoT>.

"Machine Guarding", Occupational Safety and Health Administration, Downloaded Apr. 6, 2021, 3 pages, <https://www.osha.gov/machine-guarding>.

"Nation Waste, Inc.", IBM, @ Copyright IBM Corporation 2018, 10 pages, <https://www.ibm.com/case-studies/nation-waste-inc>.

Clark et al., "IBM Employee Wellness and Safety solution in top 20 IoT industrial applications", Oct. 17, 2017, 4 pages, <https://www.ibm.com/blogs/internet-of-things/ibm-employee-wellness-safety-solution/>.

* cited by examiner

VALIDATING OPERATOR SAFETY REQUIREMENTS

BACKGROUND

The present invention relates generally to the field of the manufacturing of goods, and more particularly to validating operator safety requirements.

Manufacturing is the production of goods through the use of labor, machines, tools, and chemical or biological processing or formulation. The term 'manufacturing' may refer to a range of human activity, from handicraft to high-tech, but manufacturing is most commonly applied to industrial design, in which raw materials from the primary sector are transformed into finished goods on a large scale. Such goods may be sold to other manufacturers for the production of other more complex products (such as aircraft, household appliances, furniture, sports equipment, automobiles, etc.), or distributed via a tertiary industry to end users and consumers (usually through wholesalers, who in turn sell to retailers, who then sell to individual customers). The safety of the operators that provide the labor and run the machines and tools is important to the manufacturers. The manufacturing process are the steps through which raw materials are transformed into a final product. The manufacturing process begins with the product design, and materials specification from which a product is made. These materials are then modified through manufacturing processes to become the required manufactured good. Modern manufacturing includes all intermediate processes required in the production and integration of a product's components. Some industries, such as semiconductor and steel manufacturers, use the term fabrication rather than manufacturing.

SUMMARY OF THE INVENTION

Embodiments of the present invention include an approach for validating operator safety requirements. In one embodiment, an opt-in from at least one user of a plurality of users associated with at least one tool of a plurality of tools is received. An authentication associated with a first opted-in user of the plurality of users associated with an access of a first tool of the plurality of tools is determined. A set of credentials required to operate the first tool associated with the first opted-in user is verified. A request to an Internet of things (IoT) receiver device is transmitted. A response from an IoT transmitter device is received. In response to determining that the first user is utilizing required equipment to operate the first tool, power to the first tool is supplied.

DETAILED DESCRIPTION

Figure 1:
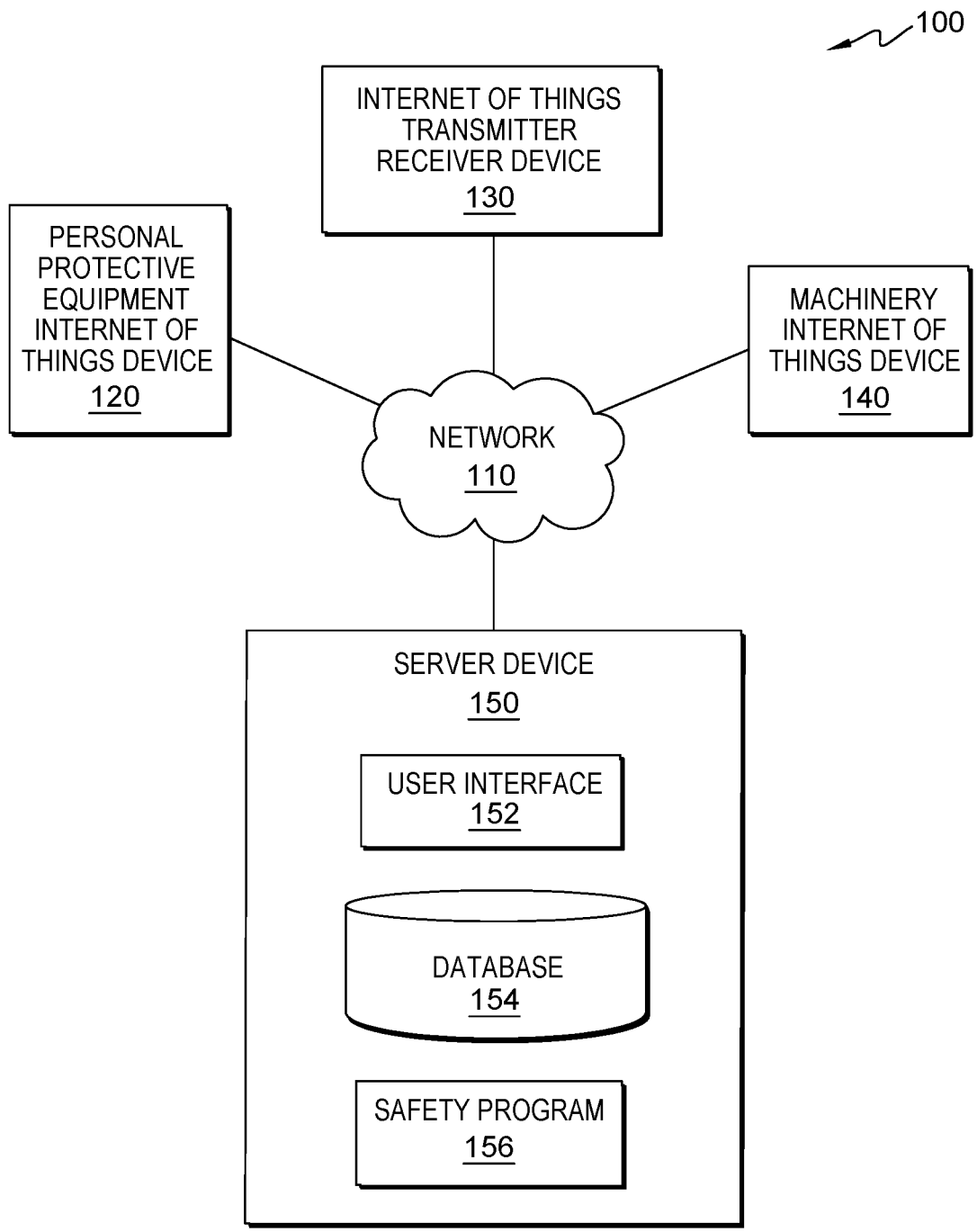
FIG. 1 depicts a functional block diagram illustrating a computing environment which includes a safety program, in accordance with an embodiment of the present invention.

Embodiments of the present invention recognize that today's manufacturing of consumer goods and other things ranges from relatively simple (e.g., wood pellets and a ball point pen) to extremely complex (e.g., a nuclear submarine and a suspension bridge). Tools, machines, and other equipment to make this range of products also varies from simple hand tools to complex machinery. Safety in the manufacturing of any consumer good or product is a priority for many manufacturers. Operator safety can broadly be described in two areas—training and equipment. Training requires teaching an operator how to use a tool or a machine safely and may require a periodic certification. Equipment is the ancillary safety equipment used by an operator to keep said operator safe during the use of the manufacturing tools (e.g., PPE or personal protective equipment like safety glasses and a hard hat). A method is needed that can easily validate that an operator meets the safety requirements needed to utilize a manufacturing tool.

Embodiments of the present invention recognize that there may be a method, computer program product, and computer system for validating operator safety requirements. The method, computer program product, and computer system improves the technology of safety audits and risk assessment by validating a tool operator's certification via an Internet of Things (IoT) device for utilizing a tool and verifies that said tool operator is wearing the appropriate PPE through the use of IoT devices (e.g., devices embedded in PPE, cameras, microphones, etc.). Embodiments of the invention improve tools and machinery (e.g., a table saw, a laser drilling tool, an excavator, etc.) by providing safety systems able to shut off said tool and machinery or otherwise prevent use of said tool and machinery if the validation fails prior to or at any point in time during operation of the tool/machinery. For example, a tool may be programmed to not "turn on" (i.e., start) if an operator is not certified to run that particular tool or the operator is not wearing the required PPE. Further, the method, computer program product, and computer system may "shut down" a tool if an operator removes PPE (e.g., safety glasses) and fails to put the PPE back on, thus, dynamically taking a proactive action to improve operator safety.

In an embodiment, an opt-in is received. In the embodiment, an authentication is determined. Further in the embodiment, credentials are verified. Further yet in the embodiment, a request is transmitted. Further yet in the embodiment, a response is received. Further yet in the embodiment, a determination is made whether required personal protective equipment (PPE) is being worn. Further yet in the embodiment, if required PPE is not being worn, power is removed from the tool and if required PPE is being worn, power is supplied to the tool. Further yet in the embodiment, the user (i.e., operator) is monitored. Further yet in the embodiment, a determination is made whether an issue is found. Further yet in the embodiment, if an issue is not found, monitoring continues and if an issue is found, power is removed from the tool. Further yet in the embodiment, a notification is transmitted.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes personal protective equipment Internet of Things device 120 (PPEIoT device 120), IoT transmitter receiver device 130 (IoTTxRx device 130), machinery IoT device 140 (MIoT device 140), and server device 150 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with PPEIoT device 120, IoTTxRx device 130, MIoT device 140, and server device 150 over network 110.

In embodiments of the present invention, PPEIoT device 120, IoTTxRx device 130, MIoT device 140, and server device 150 are connected to network 110, which enables PPEIoT device 120, IoTTxRx device 130, MIoT device 140, and server device 150 to access other computing devices and/or data not directly stored on PPEIoT device 120, IoTTxRx device 130, MIoT device 140, and server device 150. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between PPEIoT device 120, IoTTxRx device 130, MIoT device 140, and server device 150, and any other computing devices (not shown in FIG. 1) connected to network 110, in accordance with embodiments of the present invention.

According to an embodiment, PPEIoT device 120 is an IoT device embedded or otherwise attached to an article of required equipment, safety equipment, or PPE (personal protective equipment). A non-exhaustive list of PPEIoT device 120 includes eye protection (e.g., safety glasses), steel-toed footwear, gloves, reflective vests, hearing protection (e.g., earmuffs), hard hats, breathing protection (e.g., respirators and particulate masks), protective clothing to protect against temperature extremes, fire, abrasion, etc., and the like. Each article of PPEIoT device 120 is designed to protect a user (i.e., wearer) from injury (e.g., inhalation protection, eye protection, hearing protection, protection against extreme temperatures, protection against skin irritation and abrasion, etc.). Each article of PPEIoT device 120 includes a unique identification (ID) number and is IoT enabled (i.e., each article can transmit a signal, including its respective ID number, to an IoT receiver device). Further, PPEIoT device 120 is a wireless sensor used to monitor health parameters of a user. Examples of health parameters that are monitored via the wireless sensors include, but are not limited to, blood pressure, heart rate, body temperature, perspiration, oxygen saturation, blood sugar, and the like.

There are any number of PPEIoT device 120 in computing environment 100. According to the embodiment, PPEIoT device 120 transmits information to IoTTxRx device 130.

In an embodiment, IoTTxRx device 130 is a combination transmitter/receiver device (i.e., a transceiver) capable of receiving information from IoT enabled devices (e.g., PPEIoT device 120) and transmitting said information to other computing devices (e.g., server device 150). For example, if an operator of a piece of machinery is required to where safety glasses and a hard hat, a first instance of PPEIoT device 120 (associated with the operator's safety glasses) and a second instance of PPEIoT device 120 (associated with the operator's hard hat) transmit information, including a first unique ID associated with the first instance of PPEIoT device 120 and a second unique ID associated with the second instance of PPEIoT device 120, which is received by IoTTxRx device 130 and transmitted by IoTTxRx device 130 to server device 150 where the information is interpreted.

In an embodiment, MIoT device 140 is an IoT enabled device associated with a tool, piece of equipment, or piece of machinery. In the embodiment, MIoT device 140 is a smart card reader or a biometric reader. MIoT device 140 provides an authentication service for an operator of a tool, machine, or piece of equipment. Said operator will access MIoT device 140 which validates that the operator has the necessary credentials for using/operating the tool, machine, or piece of equipment. The validation process is performed by MIoT device 140 transmitting an identification associated with the operator (e.g., the name and employee number of the operator) to IoTTxRx device 130 where the information is received; the information is again transmitted to server device 150 where the validation of the operator to use the tool, machine, or piece of equipment occurs.

According to an embodiment, server device 150 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 150 can be a standalone computing device, a management server, a web server, a mobile computing device, or any other electronic device or computing system capable of receiving, transmitting, and processing data. In other embodiments, server device 150 can represent computing systems utilizing multiple computers as a server system, such as in a cloud computing environment. In certain embodiments, server device 150 represents a computer system utilizing clustered computers and components (e.g., database server computers, application server computers, etc.) that act as a single pool of seamless resources when accessed by elements of computing environment 100. In general, server device 150 is representative of any electronic device or combination of electronic devices capable of executing computer readable program instructions. According to one embodiment, server device 150 is a computing device for validating operator safety requirements. In an embodiment, computing environment 100 includes any number of server device 150. Server device 150 may include internal and external hardware components as depicted and described in further detail with respect to FIG. 3, in accordance with embodiments of the present invention. In an embodiment, server device 150 includes user interface (UI) 152, database 154, and safety program 156.

According to an embodiment, UI 152 provides an interface between a user of server device 150, PPEIoT device 120, IoTTxRx device 130, MIoT device 140, and safety program 156. UI 152 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 152 may also be mobile application software that provides an interface between server device 150, PPEIoT device 120, IoTTxRx device 130, MIoT device 140, and safety program 156. Mobile application software, or an "app," is a computer program designed to run on smartphones, tablet computers and other mobile devices. UI 152 enables a user of server device 150 to interact with information received from IoTTxRx device 130, safety program 156, any other programs and applications included on server device 150 (not shown in FIG. 1), and any other computing devices (not shown in FIG. 1).

In an embodiment, database 154 is an organized collection of data, generally stored and accessed electronically from a computing system such as server device 150 that is written to and/or read by PPEIoT device 120, IoTTxRx device 130, MIoT device 140, server device 150, safety program 156, and any other programs and applications on PPEIoT device 120, IoTTxRx device 130, MIoT device 140, and server device 150. In one embodiment, database 154 resides on server device 150. In other embodiments, database 154 resides on PPEIoT device 120, IoTTxRx device 130, MIoT device 140, on any other device (not shown in FIG. 1) in computing environment 100, in cloud storage, or on another computing device accessible via network 110. In yet another embodiment, database 154 represents multiple storage devices within server device 150. Database 154 may be implemented using any volatile or non-volatile storage media for storing information, as known in the art. For example, database 154 may be implemented with a tape library, optical library, one or more independent hard disk drives, multiple hard disk drives in a redundant array of independent disks (RAID), solid-state drives (SSD), or random-access memory (RAM). Similarly, database 154 may be implemented with any suitable storage architecture known in the art, such as a relational database, an object-oriented database, or one or more tables. In an embodiment of the present invention, participant PPEIoT device 120, IoTTxRx device 130, MIoT device 140, server device 150, safety program 156, and any other programs and applications (not shown in FIG. 1) operating on server device 150 may store, read, modify, or write data to database 154. In an embodiment of the present invention, data stored to database 154 includes, but is not limited to, employee information such as a name, employee number, a listing of equipment the employee is certified to operate, and a listing of required PPE for each tool and machine used by the employee's company.

According to an embodiment of the present invention, safety program 156 is a program, a subprogram of a larger program, an application, a plurality of applications, or mobile application software, which functions to validate operator safety requirements. A program is a sequence of instructions written to perform a specific task. In an embodiment, safety program 156 runs independently. In other embodiments, safety program 156 depends on system software and/or other programs (not shown in FIG. 1) to execute. According to an embodiment, safety program 156 is a cognitive system based on artificial intelligence utilizing machine learning and deep learning which determines whether an operator is approved to use a tool or piece of equipment and further determines if the operator is utilizing the required PPE to operate any specific tool, machine, or piece of equipment. In one embodiment, safety program 156 functions as a stand-alone program residing on server device 150. In another embodiment, safety program 156 works in conjunction with other programs, applications, etc., found in computing environment 100. In yet another embodiment, safety program 156 resides on other computing devices such as PPEIoT device 120, IoTTxRx device 130, and MIoT device 140 in computing environment 100, which are interconnected to server device 150 via network 110.

According to an embodiment, safety program 156 receives at least one user opt-in. In the embodiment, safety program 156 determines authentication of the at least one user. Further in the embodiment, safety program verifies credentials of the at least one user. Further yet in the embodiment, safety program 156 transmits a request. Further yet in the embodiment, safety program 156 receives a response. Further yet in the embodiment, safety program 156 determines whether the at least one user is wearing the required personal protective equipment (PPE). Further yet in the embodiment, safety program 156 either removes power from a tool and transmits a warning (when the user is not wearing the required PPE) or supplies power to the tool (when the user is wearing the required PPE). Further yet in the embodiment, responsive to supplying power to operate the tool, safety program 156 monitors the user. Further yet in the embodiment, safety program 156 determines whether an issue is identified. Further yet in the embodiment, safety program 156 either continues to monitor the user (when an issue is not identified) or removes power from the tool (when an issue is identified such as fatigue or non-compliance with PPE requirements). Further yet in the embodiment, safety program 156 transmits a notification.

Figure 2:
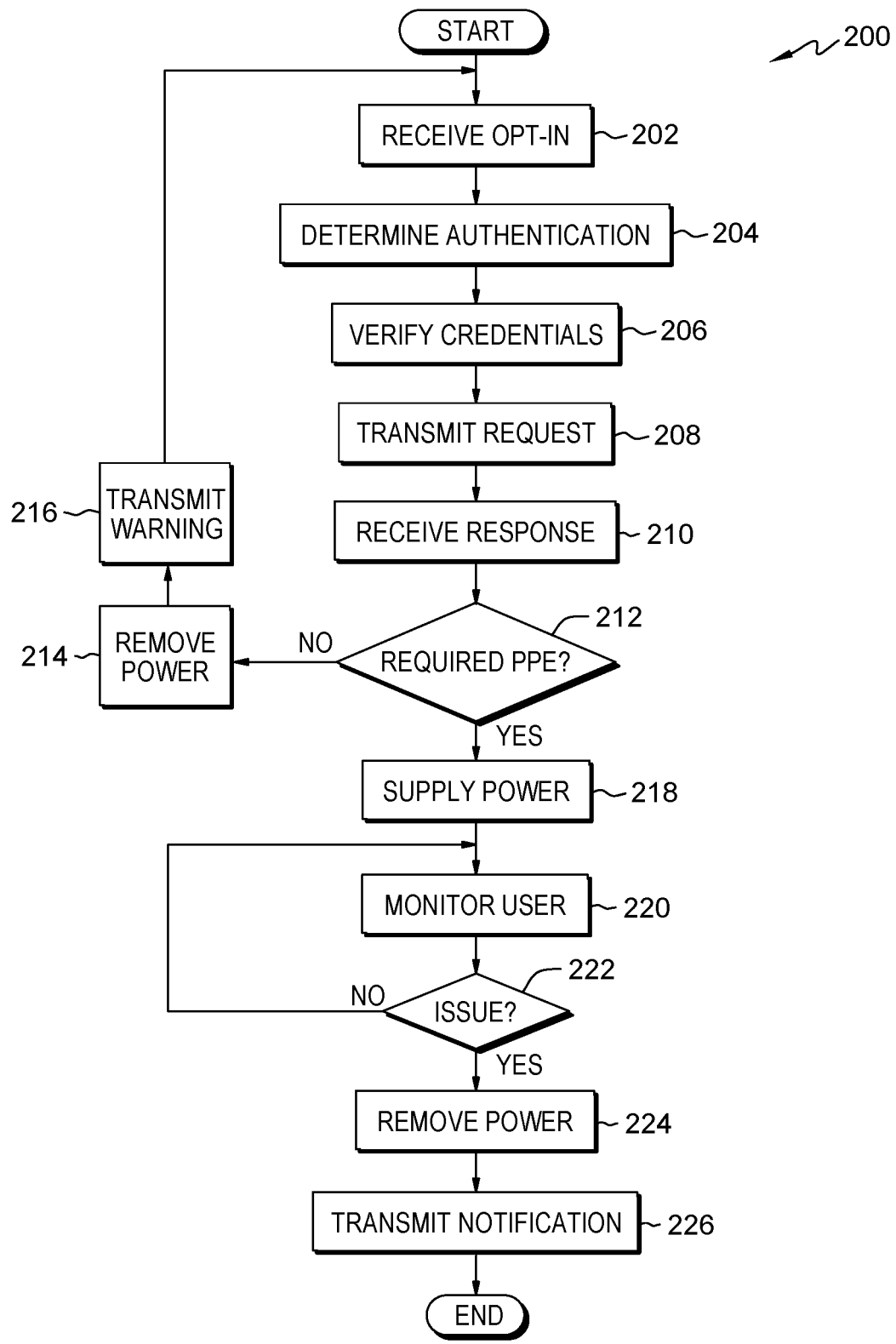
FIG. 2 is a flowchart depicting operational steps of a program for validating operator safety requirements, on a computing device within the computing environment of FIG. 1, in accordance with an embodiment of the present invention.

FIG. 2 is a flowchart of workflow 200 depicting operational steps for validating operator safety requirements. In one embodiment, the method of workflow 200 is performed by safety program 156. In an alternative embodiment, the method of workflow 200 is performed by any other program in computing environment 100 working with safety program 156. In an embodiment, a user of server device 150 invokes workflow 200 upon accessing safety program 156. In another embodiment, workflow 200 and safety program 156 are invoked by a user accessing MIoT device 140. In yet another embodiment, workflow 200 is invoked upon the receipt of information from IoTTxRx device 130.

In an embodiment, safety program 156 receives opt-in (step 202). In other words, safety program 156 receives an acknowledgement from one or more users to participate (i.e., opt-in) in using safety program 156. In an embodiment, safety program 156 may utilize various accessible data sources that may include personal data, content, or information the one or more users wish not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting-in to use safety program 156 enables the authorized and secure processing of personal data. Safety program 156 provides informed consent, with notice of the collection of personal data, allowing the one or more users to opt-in or opt-out of processing personal data. Consent can take several forms. Opt-in consent can impose on a user to take an affirmative action before personal data is processed. Alternatively, opt-out consent can impose on the user to take an affirmative action to prevent the processing of personal data before personal data is processed. Safety program 156 provides information to the one or more opted-in users regarding personal data and the nature (e.g., type, scope, purpose, duration, etc.) of the processing. Safety program 156 provides the one or more users with copies of stored personal data. Further, safety program 156 allows for the correction or completion of incorrect or incomplete personal data and also allows for the immediate deletion of personal data. According to an embodiment, safety program 156 on server device 150 receives an opt-in over network 110 from several users associated with various instances of machinery Internet of Things (MIoT) device 140. For example, a safety program on a 'WeFabStuff' company server receives two opt-ins, one each from Bo and Derek. In the example, the safety program also receives an opt-out from Hal.

According to an embodiment of the present invention, safety program 156 determines authentication (step 204). In other words, safety program 156 determines the authentication of a user attempting to operate a tool, machine, or piece of equipment (tool will be used from this point forward in this document to represent any of instance of a tool, machine, or piece of equipment). In an embodiment, safety program 156 determines the authentication of the user by identifying the user. The user will initiate access to a tool via an IoT device such as a camera, a smart card reader (using a smart card assigned to the user), and a biometric reader (using, for example, a fingerprint of the user or any other biometric attribute of said user). Based on the information received by the IoT device, safety program 156 authenticates the user by comparing the received information from the IoT device to information associated with the user which is stored to a database. According to an embodiment of the present invention, safety program 156 on server device 150 determines the authentication of a user accessing a tool associated with MIoT device 140 via IoTTxRx device 130 over network 110. For example, the program on the 'WeFabStuff' server determines the authentication of Bo based on comparing Bo's fingerprint from a biometric reader associated with the laser drilling tool in the 'WeFabStuff' production facility to an image of Bo's fingerprint which has been previously taken and stored to an employee database.

In an embodiment, safety program 156 verifies credentials (step 206). In other words, safety program 156 verifies the credentials associated with the authenticated user. According to an embodiment, safety program 156 verifies the credentials of the authenticated user. The credentials include items such as the name of the authenticated user, an employee number of the user, a photo of the user, the certification(s) of the user, information associated with the tool the user is accessing, and PPE assigned to the user. Based on the credentials, safety program 156 verifies that the user is trained to operate the tool safely via the user's certifications and that the user has been assigned the appropriate PPE to operate the tool. Safety program 156 performs said verification by checking the authenticated user against a database of users and their associated credentials (i.e., tool certifications, completed training requirements, etc.). If safety program 156 is unable to verify the credentials of the authenticated user, safety program 156 ends without supplying power to the tool. According to an embodiment of the present invention, safety program 156 on server device 150 verifies credentials of a user by retrieving data associated with the user from database 154 on server device 150; the retrieved data includes the user's certifications and the required PPE for each tool the user is certified to operate. For example, the program on the 'WeFabStuff' server verifies the credentials for Bo to operate the laser drilling tool by retrieving Bo's tool certifications and verifying that Bo is properly trained to operate the laser drilling tool. Further, the safety program identifies that Bo is required to wear (i) a hard hat, (ii) earmuffs, and (iii) laser safety glasses to operate the laser drilling tool and that Bo has been assigned these three pieces of PPE.

According to an embodiment, safety program 156 transmits a request (step 208). In other words, safety program 156 transmits a request to an IoT device associated with the tool which is to be operated by the user. In an embodiment, the transmitted request is sent using any technology known in the art and is a query to the IoT device to provide a listing of the PPE being worn by the operator (i.e., user) that recently accessed the tool associated via the IoT device. The IoT device will 'read' the unique signals from any IoT enabled PPE within range and transmit that information back to safety program 156. According to an embodiment of the present invention, safety program 156 on server device 150 transmits a request via IoTTxRx device 130 over network 110 to MIoT device 140 which in turn 'reads' all of the unique signals from PPEIoT device 120 that are in range of MIoT device 140. For example, the safety program on the 'WeFabStuff' server transmits a request to an IoT device associated with the laser drill tool; said IoT device reads unique signals from PPE being worn by Bo (i.e., Bo's hard hat, earmuffs, and laser safety glasses). The IoT device also reads three additional unique signals from Derek's assigned PPE—Derek's hard hat, earmuffs, and laser safety glasses.

In an embodiment, safety program 156 receives response (step 210). In other words, safety program 156 receives a response based on the transmitted request. According to an embodiment, the response received by safety program 156 includes the listing of IoT enabled PPE as detected by the IoT device associated with the tool to be operated. In an embodiment, safety program 156 receives a response from MIoT device 140 via IoTTxRx device 130 on network 110 that includes a listing of the unique instances of PPEIoT device 120 which were detected. For example, the safety program on the 'WeFabStuff' server receives the PPE information for Bo and Derek from the IoT device associated with the laser drill tool.

According to an embodiment, safety program 156 determines whether required personal protective equipment (PPE) is in use (decision step 212). In other words, safety program 156 determines whether the tool user is utilizing the required PPE to operate said tool. The determination is made by safety program 156 by comparing the received listing of in-use PPE to an available database of required PPE such that the required PPE is a subset of the in-use PPE. In an embodiment (decision step 212, NO branch), safety program 156 determines that the required PPE is not being used; therefore, safety program 156 proceeds to step 214 to remove power from the tool. In the embodiment (decision step 212, YES branch), safety program 156 determines that the required PPE is being used; therefore, safety program 156 proceeds to step 218 to supply power to the tool.

In an embodiment, safety program 156 removes power (step 214). In other words, responsive to determining that the required PPE is not being used by the operator to run the tool, safety program 156 removes the power from said tool. According to an embodiment, safety program 156 turns off the power to the tool (if the tool is currently powered) or prevents power from being supplied to the tool (if the tool is not currently powered). Safety program 156 controls the enabling/disabling of the power supply to the tool by using a remote controlled switch, a remote controlled circuit breaker, or any other technology for controlling power known in the art. In an embodiment, safety program 156 removes power from the tool associated with MIoT device 140. For example, if Bo is not wearing one or more of his assigned PPE (i.e., the hard hat, earmuffs, and laser safety glasses), the safety program on the 'WeFabStuff' server shuts off the power supply to the laser drill tool so that it cannot be operated by Bo.

According to an embodiment, safety program 156 transmits a warning (step 216). In other words, safety program 156 transmits a warning to the tool operator (i.e., user). In an embodiment, the transmitted warning is sent only to a computing device (e.g., a smartwatch or a smartphone) associated with the tool operator via any technology known in the art. In another embodiment, the transmitted warning is sent to both the tool operator and the tool operator's supervisor. The transmitted warning includes an admonition that the tool operator must use all of the required PPE to operate the tool. Following the warning, safety program 156 will again determine authentication of a user accessing the tool. According to an embodiment, safety program 156 transmits a warning to a computing device (not shown in FIG. 1) associated with the operator of the tool associated with MIoT device 140. For example, the safety program on the 'WeFabStuff' server transmits a warning to Bo's smartphone; the warning communicates to Bo to check the required PPE needed to operate the laser drill tool.

In an embodiment, safety program 156 supplies power (step 218). In other words, responsive to determining that the required PPE is being worn by the operator intending to run the tool, safety program 156 supplies power to said tool. According to an embodiment, safety program 156 controls the enabling/disabling of the power supply to the tool by using a remote controlled switch, a remote controlled circuit breaker, or any other technology for controlling power known in the art. In an embodiment, safety program 156 supplies power to the tool associated with MIoT device 140. For example, based on Bo wearing the required PPE, the safety program on the 'WeFabStuff' server enables the power supply to the laser drill tool so that Bo is able to operate said tool.

According to an embodiment, safety program 156 monitors user (step 220). In other words, safety program 156 monitors (i.e., observes) the user as said user operates the tool. In an embodiment, safety program 156 monitors the user via any number of IoT devices and wireless sensors. Examples of said IoT devices include, but are not limited to, cameras, blood pressure monitors, heart rate monitors, perspiration sensors, body temperature monitors, blood sugar sensors, and the like. The IoT devices monitor the health of the user operating the tool and ensure that only said user operates said tool (i.e., user 'A', who has been authenticated and verified cannot be replaced by user 'B' who may not have the appropriate credentials without user 'B' being authenticated and verified by safety program 156). According to an embodiment of the present invention, safety program 156 on server device 150 monitors the user over network 110 via any number of instances of PPEIoT device 120. For example, the safety program on the 'WeFabStuff' server monitors Bo as Bo operates the laser drill tool.

In an embodiment, safety program 156 determines whether an issue is identified (decision step 222). In other words, safety program 156 determines whether safety issues are identified as the user operates the tool. According to an embodiment, the determination is made based on receiving information from wireless sensors associated with the user as well as observing said user via available cameras. In an example, if a user's blood pressure and/or heart rates suddenly increases relative to said user's normal levels, the user may be getting fatigued and a safety issue may arise (and thus, an issue is identified). In another example, a user observed "nodding" may indicate that said user is drowsy and thus, an issue is identified. In yet another example, a user who removes a piece of required PPE is also an identified issue as the user may be harmed without said PPE. In one embodiment (decision step 222, NO branch), safety program 156 determines that no issues are identified; therefore, safety program 156 continues to monitor the user. In the embodiment (decision step 222, YES branch), safety program 156 determines that at least one issue is identified; therefore, safety program 156 proceeds to step 224 to remove power from the tool.

According to an embodiment, safety program 156 removes power (step 224). In other words, responsive to identifying an issue via monitoring the user, safety program 156 removes the power from the tool so that the tool cannot operate. In an embodiment, safety program 156 follows any appropriate shutdown requirements for the tool so that neither the product being made or the tool itself is damaged when the power is removed. However, if the user is in imminent danger, the power to the tool will be removed immediately without regard for the product or the tool. Power is removed from the tool in the manner previously described above. According to an embodiment, safety program 156 on server device 150 removes the power from the tool associated with MIoT device 140 and the various instances of PPEIoT device 120. For example, the safety program on the 'WeFabStuff' server shuts off the power to the laser drill tool when Bo is observed nodding (i.e., falling asleep) at the control panel of the laser drill tool. In another example, if Bo removed his earmuffs to take a phone call and forgot to put them back on, the safety program may (i) transmit a reminder warning to Bo's smartphone and (ii) turn off the power to the laser drill tool if Bo does not heed the reminder.

In an embodiment, safety program 156 transmits a notification (step 226). In other words, safety program 156 transmits a notification to the tool operator indicating why the power was removed from the tool. According to an embodiment, the notification is transmitted to a computing device associated with the operator using any technology known in the art. According to another embodiment, the notification is transmitted to both the operator and a supervisor. The notification may include the reason that power was removed (e.g., the operator is not using the required PPE), it may provide an indication that the operator appears to be fatigued (e.g., based on the observed nodding and elevated blood pressure, the operator appears to require a break), and/or it may provide an indication that the operator appears ill (e.g., the body temperature of the operator is registering too far above normal so the operator may be sick). In an embodiment, safety program 156 on server device 150 transmits a notification over network 110 to the user associated with MIoT device 140. For example, the safety program on the 'WeFabStuff' server transmits a notification to Bo (said notification is received by Bo's smartphone). The notification indicates to Bo that he should take a break from operating the laser drill tool because Bo was observed nodding while operating the tool. The notification is also transmitted to a computing device associated with Bo's supervisor so that said supervisor can take appropriate action (i.e., check on Bo's health, relieve Bo with another certified operator, etc.).

According to another embodiment of the present invention, safety program 156 is able to configure the parameters of the tool based on the certification of the operator. For example, if an operator is partially trained, various safety interlocks may remain in place for operating the tool (e.g., the laser cannot be powered but the laser programming may be accessed, or a piece of heavy equipment may be speed-limited for an partially trained driver), the tool may not operate at full capacity (e.g., at full speed, highest temperature, highest laser output, etc.), and/or only certain goods may be produced by the operator.

According to yet another embodiment, a history of each tool operator associated with each tool will be created and maintained by safety program 156. Said operator history may be used by safety program 156 to configure the operating parameters of a tool. For example, a less-experienced operator may not have access to the full capability of a tool while an experienced operator will have access to the full capability. Similarly, safety program 156 can use the history of an operator to determine when an operator should take a break (e.g., an experienced operator can run a tool longer than a less-experienced operator due to the mental fatigue required to safely operate many tools.

Figure 3:
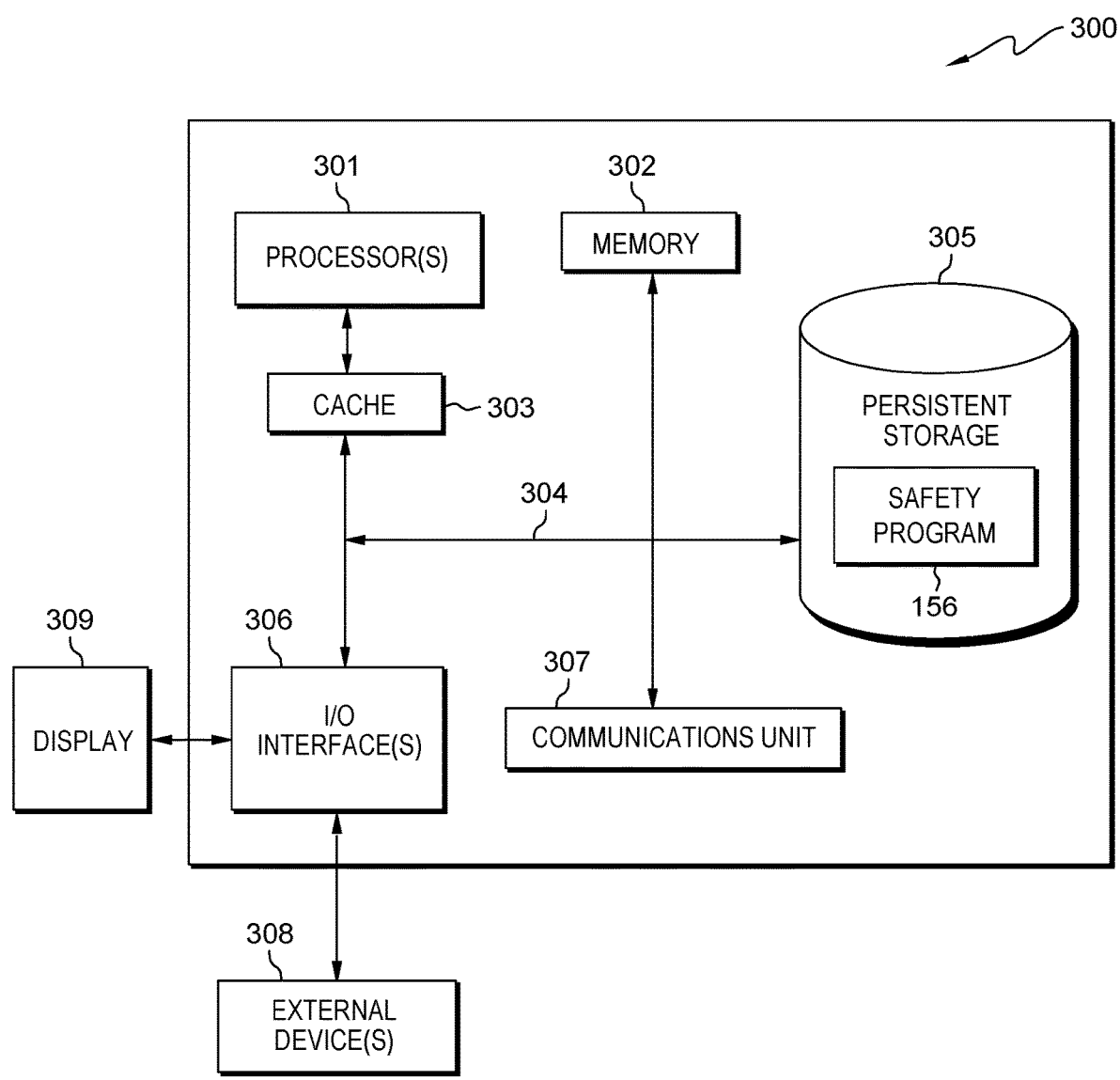
FIG. 3 depicts a block diagram of components of a computing device executing a safety program within the computing environment of FIG. 1, in accordance with an embodiment of the present invention.

FIG. 3 depicts computer system 300, which is an example of a system that includes safety program 156. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    receiving, by one or more computer processors, an opt-in from at least one user of a plurality of users associated with at least one tool of a plurality of tools;
    determining, by one or more computer processors, an authentication associated with a first opted-in user of the plurality of users associated with an access of a first tool of the plurality of tools;
    verifying, by one or more computer processors, a set of credentials required to operate the first tool associated with the first opted-in user;
    transmitting, by one or more computer processors, a request to an Internet of things (IoT) receiver device;
    receiving, by one or more computer processors, a response from an IoT transmitter device; and
    responsive to determining that the first user is utilizing required equipment to operate the first tool, supplying, by one or more computer processors, power to the first tool.

2. The method of claim 1, further comprising:
    responsive to determining that the first user is not utilizing the required equipment to operate the first tool, removing, by one or more computer processors, the power from the first tool; and
    transmitting, by one or more computer processors, a warning to at least the first user indicating that the first user must utilize the required equipment to operate the first tool.

3. The method of claim 1, further comprising:
    responsive to supplying power to the first tool, monitoring, by one or more computer processors, the first user operating the first tool;
    responsive to identifying an issue with the first user operating the first tool, removing, by one or more computer processors, the power from the first tool such that the first tool no longer operates; and transmitting, by one or more computer processors, a notification to the first user and a supervisor of the first user.

4. The method of claim 3, wherein the identified issue is selected from the group consisting of a removal by the first user of the required equipment, a fatigue issue of the first user, and an illness of the first user.

5. The method of claim 1, wherein determining that the first user is utilizing required equipment to operate the first tool comprises:
comparing, by one or more computer processors, a first list of equipment being used by the first operator to operate the first tool to a second list of equipment which are required to operate the first tool; and
verifying, by one or more computer processors, that the second list is at least a subset of the first list.

6. The method of claim 1, wherein:
the equipment is one or more articles of personal protective equipment (PPE) which include at least one IoT device each;
a first IoT device in the one or more articles of PPE is capable of transmitting a signal to an IoT receiver device, wherein the signal includes a unique identification associated an individual article of PPE in the one or more articles of PPE; and
a second IoT device in the one or more articles of PPE is capable of transmitting health related information of the first user to the IoT receiver device.

7. The method of claim 1, wherein:
the first tool includes at least one of a smart card reader and a biometric reader for providing an authentication of the first user to operate the first tool;
the smart card reader reads data from a smart card assigned to the first user; and
the biometric reader reads at least one biometric attribute of the first user.

8. A computer program product, the computer program product comprising:
one or more computer readable storage media; and
program instructions stored on the one or more computer readable storage media, the program instructions comprising:
program instructions to receive an opt-in from at least one user of a plurality of users associated with at least one tool of a plurality of tools;
program instructions to determine an authentication associated with a first opted-in user of the plurality of users associated with an access of a first tool of the plurality of tools;
program instructions to verify a set of credentials required to operate the first tool associated with the first opted-in user;
program instructions to transmit a request to an Internet of things (IoT) receiver device;
program instructions to receive a response from an IoT transmitter device; and
responsive to determining that the first user is utilizing required equipment to operate the first tool, program instructions to supply power to the first tool.

9. The computer program product of claim 8, further comprising program instructions stored on the one or more computer readable storage media, to:
responsive to determining that the first user is not utilizing the required equipment to operate the first tool, remove the power from the first tool; and
transmit a warning to at least the first user indicating that the first user must utilize the required equipment to operate the first tool.

10. The computer program product of claim 8, further comprising program instructions stored on the one or more computer readable storage media, to:
responsive to supplying power to the first tool, monitor the first user operating the first tool;
responsive to identifying an issue with the first user operating the first tool, remove the power from the first tool such that the first tool no longer operates; and
transmit a notification to the first user and a supervisor of the first user.

11. The computer program product of claim 10, wherein the identified issue is selected from the group consisting of a removal by the first user of the required equipment, a fatigue issue of the first user, and an illness of the first user.

12. The computer program product of claim 8, wherein the program instructions to determine that the first user is utilizing required equipment to operate the first tool comprises:
program instructions to compare a first list of equipment being used by the first operator to operate the first tool to a second list of equipment which are required to operate the first tool; and
program instructions to verify that the second list is at least a subset of the first list.

13. The computer program product of claim 8, wherein:
the equipment is one or more articles of personal protective equipment (PPE) which include at least one IoT device each;
a first IoT device in the one or more articles of PPE is capable of transmitting a signal to an IoT receiver device, wherein the signal includes a unique identification associated an individual article of PPE in the one or more articles of PPE; and
a second IoT device in the one or more articles of PPE is capable of transmitting health related information of the first user to the IoT receiver device.

14. The computer program product of claim 8, wherein:
the first tool includes at least one of a smart card reader and a biometric reader for providing an authentication of the first user to operate the first tool;
the smart card reader reads data from a smart card assigned to the first user; and
the biometric reader reads at least one biometric attribute of the first user.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to receive an opt-in from at least one user of a plurality of users associated with at least one tool of a plurality of tools;
program instructions to determine an authentication associated with a first opted-in user of the plurality of users associated with an access of a first tool of the plurality of tools;
program instructions to verify a set of credentials required to operate the first tool associated with the first opted-in user;
program instructions to transmit a request to an Internet of things (IoT) receiver device;

program instructions to receive a response from an IoT transmitter device; and responsive to determining that the first user is utilizing required equipment to operate the first tool, program instructions to supply power to the first tool.

16. The computer system of claim 15, further comprising program instructions stored on the one or more computer readable storage media for execution by at least one of the one or more computer processors, to:

responsive to determining that the first user is not utilizing the required equipment to operate the first tool, remove the power from the first tool; and transmit a warning to at least the first user indicating that the first user must utilize the required equipment to operate the first tool.

17. The computer system of claim 15, further comprising program instructions stored on the one or more computer readable storage media for execution by at least one of the one or more computer processors, to:

responsive to supplying power to the first tool, monitor the first user operating the first tool;

responsive to identifying an issue with the first user operating the first tool, remove the power from the first tool such that the first tool no longer operates; and transmit a notification to the first user and a supervisor of the first user.

18. The computer system of claim 17, wherein the identified issue is selected from the group consisting of a removal by the first user of the required equipment, a fatigue issue of the first user, and an illness of the first user.

19. The computer system of claim 15, wherein the program instructions to determine that the first user is utilizing required equipment to operate the first tool comprises:

program instructions to compare a first list of equipment being used by the first operator to operate the first tool to a second list of equipment which are required to operate the first tool; and program instructions to verify that the second list is at least a subset of the first list.

20. The computer system of claim 15, wherein:

the equipment is one or more articles of personal protective equipment (PPE) which include at least one IoT device each;

a first IoT device in the one or more articles of PPE is capable of transmitting a signal to an IoT receiver device, wherein the signal includes a unique identification associated an individual article of PPE in the one or more articles of PPE; and a second IoT device in the one or more articles of PPE is capable of transmitting health related information of the first user to the IoT receiver device.

* * * * *